Nov. 2, 1965  C. B. BINNINGS  3,214,918
MANDREL FOR PILE CASINGS
Filed Aug. 15, 1962  4 Sheets-Sheet 1

INVENTOR
CLEM B. BINNINGS
BY Kingsland, Rogers, Ezell & Robbins
ATTORNEYS

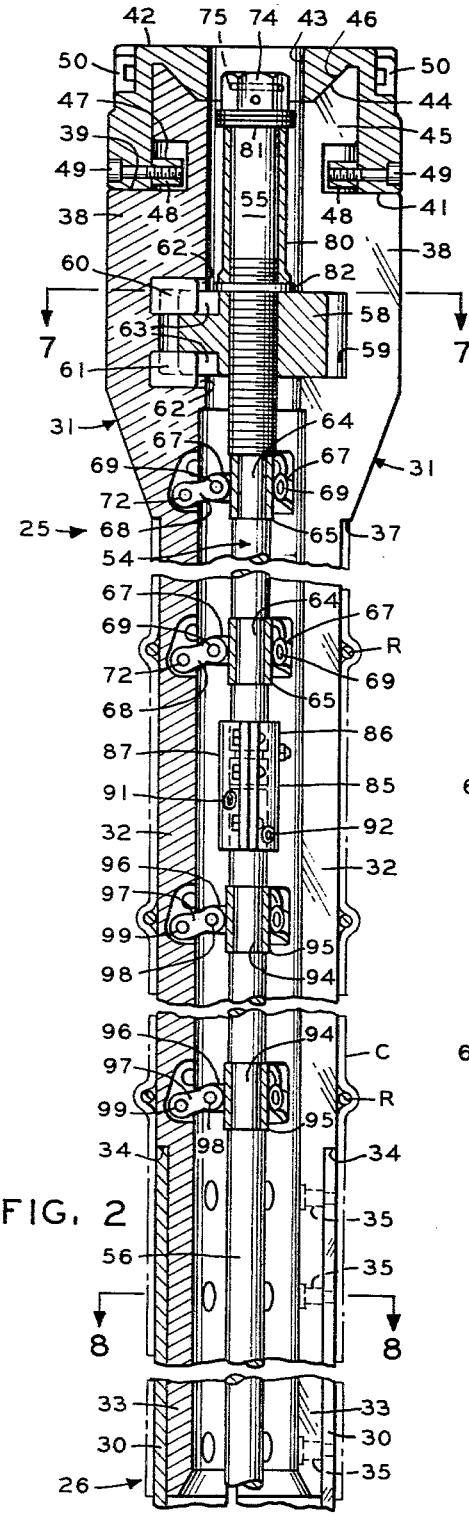

Nov. 2, 1965   C. B. BINNINGS   3,214,918
MANDREL FOR PILE CASINGS
Filed Aug. 15, 1962   4 Sheets-Sheet 3
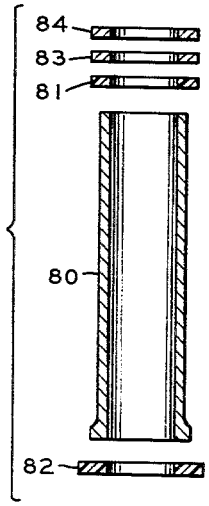
FIG. 15
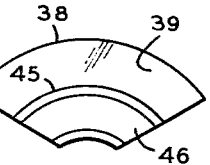
FIG. 9
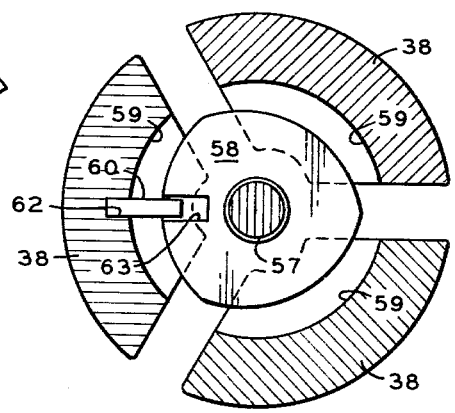
FIG. 7
FIG. 20
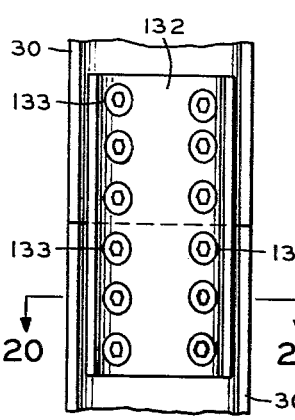
FIG. 16
FIG. 17
FIG. 19
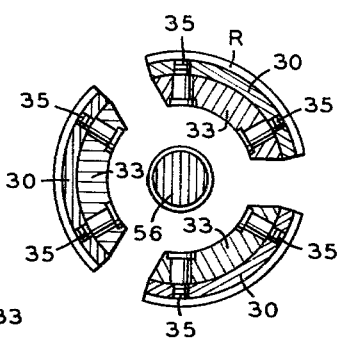
FIG. 8
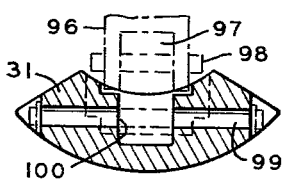
FIG. 11
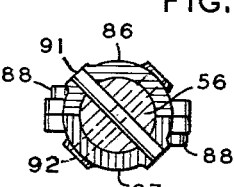
FIG. 18
INVENTOR
CLEM B. BINNINGS
BY Kingsland, Rogers, Ezell & Robbins
ATTORNEYS Nov. 2, 1965 C. B. BINNINGS 3,214,918
MANDREL FOR PILE CASINGS
Filed Aug. 15, 1962 4 Sheets-Sheet 4
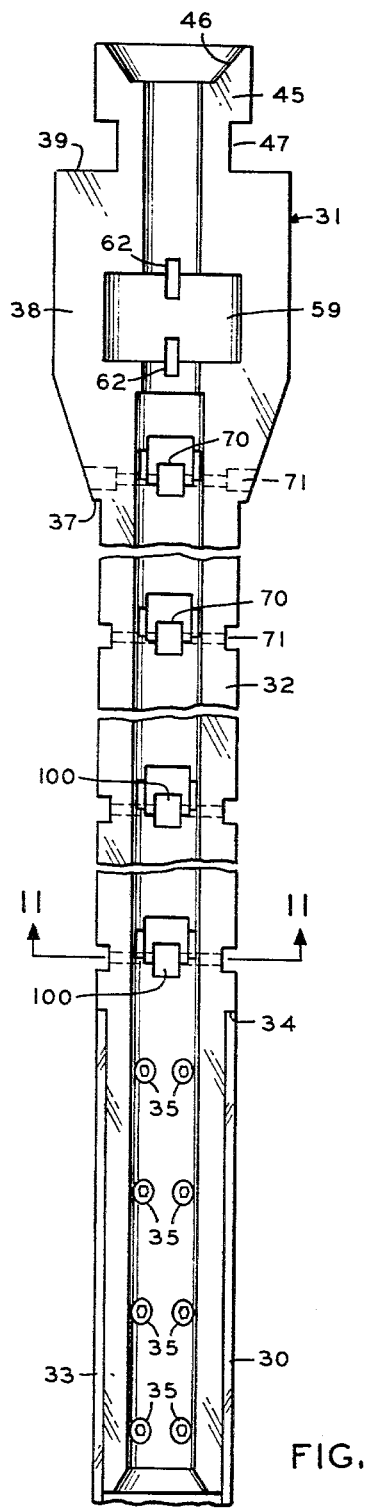
FIG. 10
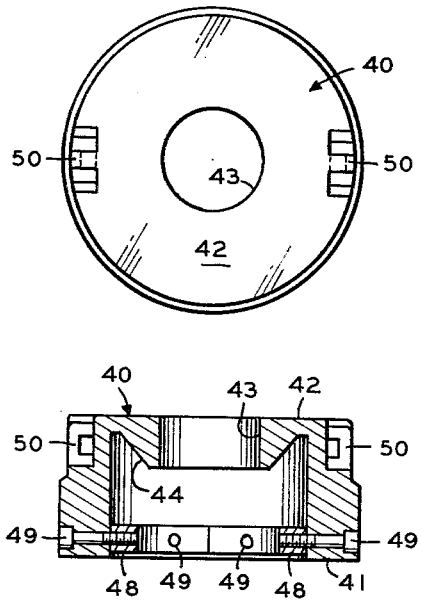
FIG. 12
FIG. 13
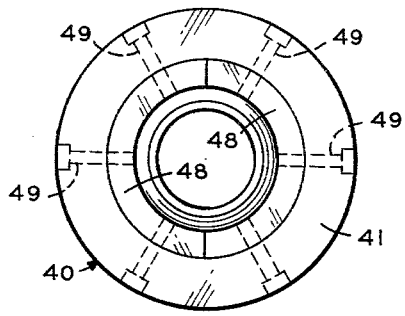
FIG. 14
INVENTOR
CLEM B. BINNINGS
BY Kingsland, Rogers, Ezell & Robbins
ATTORNEYS

United States Patent Office 3,214,918
Patented Nov. 2, 1965

3,214,918
MANDREL FOR PILE CASINGS
Clem B. Binnings, New Orleans, La., assignor, by mesne assignments, to Whitney National Bank of New Orleans
Filed Aug. 15, 1962, Ser. No. 217,121
6 Claims. (Cl. 61—53.72)

This invention relates to a mandrel for driving pile casings, and particularly to a mandrel having positive operating mechanical apparatus for expanding and contracting the sections of the mandrel.

This invention is an improvement upon my co-pending application for United States Letters Patent Serial Number 92,078, filed February 27, 1961, now Patent No. 3,145,541, entitled Expandable Mandrel, and assigned to the same assignee as is the present invention.

In brief, this mandrel has a plurality of elongated segments, preferably three in number, which are connected by toggle links to a central shaft about which the segments are positioned. The mandrel has a composite head comprised of a plurality of castings equal in number to the number of elongated segments. The upper end of each head section is smaller and is received against the inner surface of the adjacent elongated segment. The head sections are spaced from one another and the central shaft extends upwardly through the space between the sections.

The central shaft is comprised of two principal parts, although each part may contain more than one extension removably connected end to end to accommodate variations in overall length of the mandrel. The upper principal part of the shaft is rotatably received within a plurality of collars, whereas the lower part of the shaft is stationary and does not rotate. A collar connects the lower end of the upper shaft part to the upper end of the lower shaft part and permits rotation of the upper shaft part while preventing relative movement of the two shaft parts in a vertical direction. The upper or rotating shaft part is threaded through a "floating nut," or "thrust plate," that is locked against vertical movement relative to the head sections. Hence, when the upper shaft part is rotated, it threads up or down relative to the "floating nut." This vertical movement of the upper shaft part is accompanied by an equal vertical movement of the lower shaft part.

As the central shaft moves downwardly upon rotation of the upper shaft part, the toggle link connections to the elongated segments cause these segments to expand outwardly from the shaft. Rotation of the upper shaft part in the opposite direction, which draws the entire central shaft upwardly, operates through the toggle links to contract the elongated segments.

A cap fits on top of the head sections. The cap and the head sections have complementary inclined surfaces and when driving hammer forces are applied to the top of the cap, these complementary inclined surfaces produce a wedging effect of the cap against the head sections in a mandrel-expanding direction. The impact of the hammer is transmitted through the cap directly to the head sections and from the head sections directly to the elongated segments to which they are fastened. Hence, the mandrel does not rely upon the transmission of driving forces through the central shaft to the elongated segments.

In order to provide rigidity at the upper end of the mandrel, the head sections extend downwardly within the pile casing. Since the head sections are considerably more rigid than the elongated segments, these downward extensions add greatly to the strength of the mandrel at the places where the hammer driving forces are the greatest. It is therefore an object of the invention to provide an expandable mandrel for driving pile casings which has wholly mechanical means for expanding and contracting the mandrel, and which is constructed to transmit driving forces directly to the parts of the mandrel that engage the pile casing instead of transmitting these forces through the expansion means, wherein the construction of the mandrel is such to provide heavy strong parts at the places on the mandrel where the transmission of driving forces is at a maximum. In particular, it is an object of the invention to provide such a mandrel that is constructed of expandable segments connected to head castings arranged as stated in the foregoing general description.

Another feature of this mandrel is that there are a plurality of toggle links connected to the head castings and to yokes mounted on the central shaft. These toggle links provide a positive expanding force against the head castings when the mandrel is in an expanded condition, so that the head castings are positively forced against the inner wall of the pile casing, instead of being more or less kept against that inner wall by the mere bulk of their construction. It follows that another object of this invention is to provide a mandrel having a plurality of elongated segments and a plurality of head castings connected to the segments, with toggle links controlled by a central shaft for expanding both the segments and the head castings against the inner wall of the casing to prevent crippling of the mandrel at the juncture between the elongated segments and the head castings. Another object of the invention is to provide such a mandrel wherein the central shaft for expanding the mandrel is comprised of an upper rotatable part, and a lower stationary part, with toggle links connected to the head castings and to yokes which surround the upper shaft part to prevent excessive vibration of the shaft and consequent loosening of the mandrel under driving hammer forces.

It has already been mentioned that the upper rotatable shaft part is threaded through a "floating nut." This "floating nut" is received within recesses in the head castings and is restrained by the upper and lower surfaces of these recesses from moving vertically relative to the head sections. The rotatable shaft part extends above the "floating nut" with an operating nut splined to the upper end of the shaft for engagement by a pneumatic wrench. There is a tube around the shaft, between the operating nut and the "floating nut" which binds against the "floating nut" as the shaft is rotated to a mandrel-expanded condition. The friction between this tube and the "floating nut" locks the shaft to prevent contraction of the mandrel. Another object of the invention is to provide an expandable mandrel with a shaft and toggle links for expanding the mandrel and friction means for locking the mandrel in an expanded condition.

Still another object of the invention is to provide an expandable mandrel having a central shaft connected to toggle links for expanding the mandrel when the shaft is rotated with an operating nut splined to the top of the central shaft for engagement by a pneumatic wrench, the operating nut being readily removable and replaceable.

Yet another object of the invention is to provide a mandrel having expandable segments for engaging the inner wall of a pile causing and having heavy casting blocks at the lower end of the mandrel segments to provide resistance to contraction of the lower end of the mandrel.

Another object of the invention is to provide an expandable mandrel having a plurality of sections for varying the length of the mandrel and easy connecting means to connect selected ones at the sections together.

Still another object of the invention is to provide a mechanically expandable mandrel having few parts and long life.

Other objects and advantages will be apparent to those skilled in the art.

In the drawing:

FIGURE 1–A is a view of the upper section of the mandrel, taken in section through the center thereof;

FIGURE 1–B is a view of the lower section of the mandrel, taken in section through the center thereof;

FIGURE 1–C is a view of a typical middle or extension section of the mandrel, taken in section through the center thereof.

FIGURE 1–D is a view of a short extension for the mandrel taken in section through the center thereof;

FIGURE 1–A, 1–B, 1–C and 1–D are distorted to the extent that they are reduced in height beyond a corresponding reduction in width. The true relative proportions of parts are shown in the remaining figures. These proportions, however, may be varied somewhat without destroying the essence of the invention;

FIGURE 2 is a fragmentary view in longitudinal section through the center of the upper end of the mandrel;

FIGURE 3 is an elevation view in longitudinal section through the center of the lower end of the mandrel;

FIGURE 5 is an elevation view of the upper shaft part with the "floating nut" shown in section;

FIGURE 6 is an enlarged plan view of the operating nut;

FIGURE 7 is a view in section on an enlarged scale taken along the line 7—7 of FIGURE 2;

FIGURE 8 is a view in section taken along the line 8—8 of FIGURE 2;

FIGURE 9 is a plan view of a head casting of the mandrel;

FIGURE 10 is a fragmentary side elevation view of a single head casting as viewed from the inner side of the mandrel and showing certain parts connected thereto;

FIGURE 11 is a view in section taken along the line 11—11 of FIGURE 10, but with the portions of toggle link parts indicated in broken lines.

FIGURE 12 is a plan view of the cap;

FIGURE 13 is an elevation view in medial section of the cap;

FIGURE 14 is a bottom view of the cap;

FIGURE 15 is an enlarged, exploded view of the tube and washer that fit onto the upper end of the central shaft;

FIGURE 16 is a plan view of the screw collar with the shaft shown in section;

FIGURE 17 is a side elevation view of the screw collar of FIGURE 16;

FIGURE 18 is a view in section taken along the line 18—18 of FIGURE 17;

FIGURE 19 is a side elevation view of a splice plate; and

FIGURE 20 is a view in section taken along the line 20—20 of FIGURE 19; and

Figure 1A:
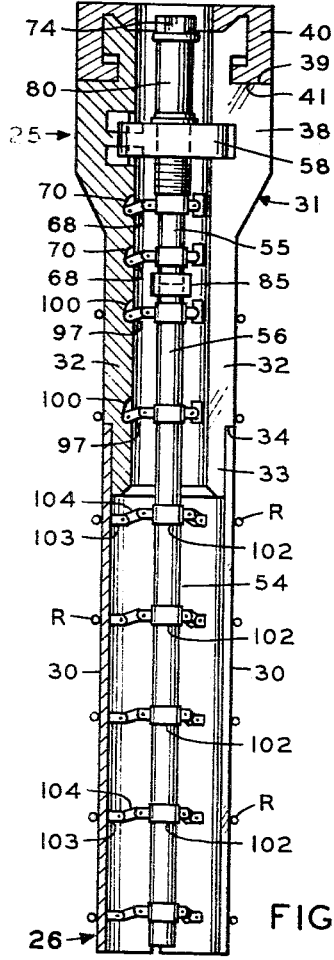
Figure 1B:
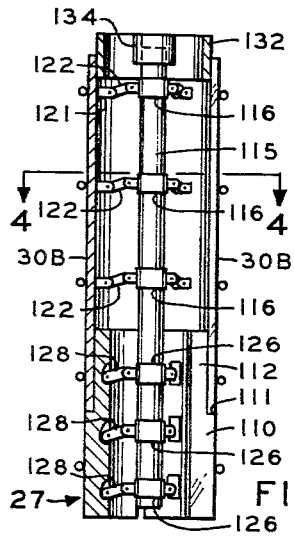
Figure 1C:
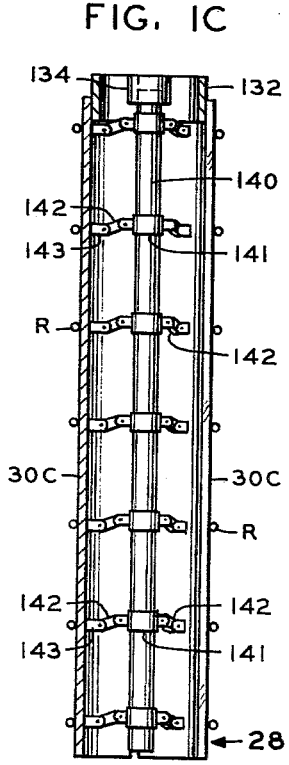
Figure 1D:
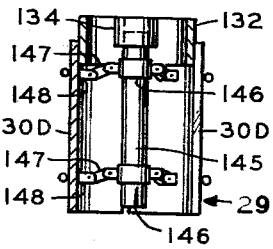
Figure 21:
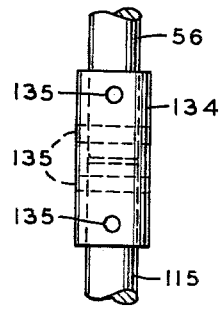
FIGURE 21 is a side elevation view of a shaft coupling.
Figure 4:
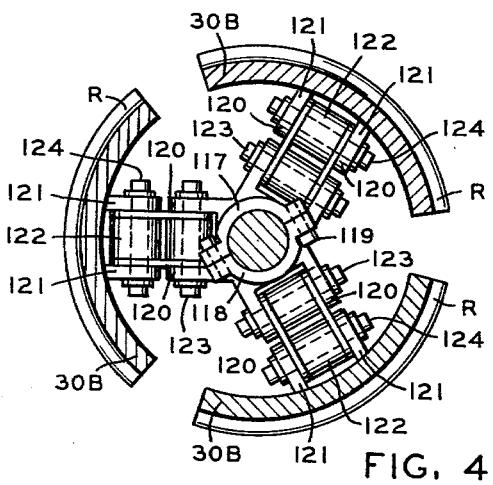
FIGURE 4 is a view in section on an enlarged scale taken along the line 4—4, FIGURE 1–B.

Referring now to the drawings, the mandrel 25 may comprise one or more of a plurality of sections 26, 27, 28 and 29, as illustrated in FIGURES 1–A, 1–B, 1–C and 1–D, which are connected together in a manner to be presently described. The upper section 26, illustrated in FIGURES 1–A and 2, is an essential part of the mandrel, and may be about twenty-four feet in length. It comprises three arcuate elongated segments 30. These elongated segments 30 are identical in size and shape and have counterparts which may become extensions 30–B, 30–C and 30–D on the sections 27, 28 and 29, respectively.

A head casting 31 is connected to the upper end of each elongated segment 30. These head castings 31 may be substantially identical, and each comprises an arcuate lower sleeve portion 32, having the same outer face radius as that of the elongated segments 30. However, the sleeve portions 32 are considerably more rigid than the segments 30, being about 2⅜ inches thick. These sleeve portions 32 are about eight feet in total length, but about a foot in length of the lowermost end 33 is of a reduced radius to receive the upper end of an elongated segment 30. The elongated segment 30 bears against a shoulder 34 where the outer radius of the sleeve portion changes. As shown in FIGURE 2 and 8, the elongated segments 30 are fastened to the sleeve portions 32 by a plurality of hexagonal head cap screws 35.

Above the sleeve portions 32, each head casting 31 has an outwardly extending shoulder 37 that also defines the lower end of an enlarged upper head portion 38 which is about 2½ feet long and six inches in thickness. These upper head portions have horizontal shoulders 39. A cap 40 is provided with a base 41 that rests upon all of the horizontal ledges or shoulders 39. The cap 40 has a top 42 with a hole 43 through its center providing access to the interior of the mandrel. There is an upwardly and outwardly inclined annular wedging surface 44 on the lower side of the top 42. At its inner side, each upper head portion 38 has an extension 45 above the horizontal ledge 41, the upper end of which has an inclined surface 46 in contact with the wedging surface 44 on the cap 40. With these wedging surfaces 44 and 46 in contact, downward pressures upon the cap 40 tend to wedge the three head castings outwardly relative to the central axis of the mandrel.

The projections 45 have inwardly extending recesses 47 just above the horizontal ledges 39. As shown in FIGURE 13 and 14, the cap 40 has two split rings 48 fastened to its lower inner side by a plurality of bolts 49, and these rings 48 are received within the recesses 47 to prevent removal of the cap 40. The recesses 47 do, however, allow some vertical movement of the cap 40. The cap has lugs 50 on opposite sides which, when engaged by a lifting crane, cause the entire mandrel to be lifted.

Expansion and contraction of the mandrel segments is controlled by a central shaft, or jacking screw, which for the upper mandrel length 26, comprises an upper shaft section 55 and a lower shaft section 56. The upper shaft section 55, shown independently in FIGURE 5, has threads 57 on it which are threaded through a floating nut or thrust plate 58. The thrust plate is received within horizontally outwardly extending recesses 59 in the head sections 31. These recesses 59 prevent the thrust plate 58 from moving vertically relative to the head castings. In addition, upper and lower keys 60 and 61, which fit into slots 62 and 63 in each head casting and in the thrust plate 58 respectively, prevent rotation of the thrust plate 58.

Below the threaded section 57, the upper shaft 55 has two reduced diameter sections 64, each of which receives a split collar 65, the halves of which are bolted together by a plurality of bolts 66. Each collar 65 has three pairs of lugs 67 extending toward the three head sections 31. Three toggle links 68 are pivotally supported between the pairs of lugs 67 by pins 69. The head castings 31 have recesses 70 for receiving the outer ends of the toggle links 68, and transverse counter sunk bores 71 for receiving pins 72 that pivotally fasten an end of the toggle links 68 to the head castings 31.

An operating nut 74 is removably fastened to the upper end of the shaft 55 by a pair of pins 75. There are mating splines 76 between the nut 74 and the shaft 55 to prevent rotation of the nut. Since the nut is separate from the shaft 55, it can be made of very hard steel to withstand the tremendous impact of a pneumatic wrench, and when the nut 74 finally wears under this impact, it can be easily replaced without replacement of the entire shaft 55.

A locking mechanism comprising a metal tube 80 is mounted on the shaft 55 between the operating nut 74 and the thrust plate 58. There is a Fabreeka washer 81 above the tube 80 and a Fabreeka washer 82 below the tube. In addition, there are metal washers 83 and 84 between the upper Fabreeka washer 81 and the operating nut 74. As the shaft 55 is threaded downwardly through the thrust plate 58, the tube 80 is compressed between the Fabreeka washers 81 and 82 with the assembly of washers and tube 80 being confined between the operating nut 74 and the thrust plate 58. When the shaft 55 is threaded downwardly far enough, the tube 80, in cooperation with these washers, frictionally locks the shaft against reverse rotation. It therefore requires a pneumatic wrench turning the operating nut 74 in an unthreading direction to loosen the shaft 55 from the locked position.

The adjacent ends of the shaft sections 55 and 56 are connected together by a screw collar 85, particularly illustrated in FIGURES 16, 17 and 18. The screw collar 85 is in two halves, 86 and 87, that are fastened together by bolts 88. Where it fits into the screw collar 85, the upper shaft section 55 has an annular groove 89 for receiving a projecting annular rib 90 on the screw collar. When the collar 85 is in place on the shaft 55, the interaction between the annular groove 89 and the annular rib 90 prevents vertical movement of the shaft 55 relative to the collar 85, but allows the shaft 55 to rotate freely within the collar 85.

The lower shaft section 56 is fixed to the screw collar 85 by a pair of pins 91 and 92 that extend through the sides of the collar 85 and through the shaft section 56. Therefore, the collar connection 85 between the upper shaft 55 and the lower shaft 56 permits relative rotation of the upper and lower shafts. However, whenever the upper shaft section 55 moves upwardly or downwardly, the lower shaft section 56 follows that vertical movement.

The lower shaft section 56 has a plurality of sections 94 of reduced diameter, each of which receives a collar 95 from which depend three pairs of lugs 96. An end of a toggle link 97 is supported between each pair of lugs 96 by a pin 98, while the other ends of these toggle links 97 are pivotally fastened by pins 99 to the head castings 31. These toggle links 97 fit within recesses 100 in the head castings. See FIGURE 11.

Opposite the elongated segments 30, there are more collars 102 fixed to the shaft section 56. There are a plurality of lugs 103 on the elongated segments 30 opposite the collars 102 with toggle links 104 pivotally connected to the collars 102 and the lugs 103.

It should now be evident that the elongated segments 30 and the head castings 31 to which they are attached, are expanded and contracted in a radial direction upon rotation of the shaft or jacking screw 54. This rotation is accomplished by engagement of the operating nut 74 by a pneumatic wrench to rotate the upper shaft section 55 and thread it through the thrust plate 58. Since the thrust plate 58 is restrained against vertical movement by the upper and lower shoulders of the recesses 59, threading of the jacking screw section 55 causes it, and the shaft section 56, to move vertically relative to the elongated segments 30 and the head castings 31. This pivots the toggle links 68, 97 and 104 toward horizontal positions and positively forces the elongated segments 30 and the head castings 31 outwardly. Counter-rotation of the jacking screw section 55 produces opposite movement of the toggle links 68, 97 and 104 to contract the mandrel. As already mentioned, the lower shaft section 56, which is connected to the upper shaft section 55 by the screw collar 85, moves vertically with the upper shaft section 55.

The extension sections 30–C and 30–D, illustrated in FIGURES 1–C and 1–D, the details of which will be described hereinafter, may or may not be used in a mandrel of particular overall length. However, it is highly desirable that the bottom section 27 be used. This section, illustrated in FIGURES 1–B and 3, may be about fourteen feet in total length, including the segment extensions 30–B and a lower casting 110 fastened to the lower end of each segment extension 30–B. Each lower casting 110 is about five to six feet in total length and about 2⅝ inches in thickness. At a distance of about 3 to 3½ feet from the lower end of each casting 110, there is a shoulder 111 that defines the beginning of a reduced diameter section 112 against which the segment extensions 30–B are positioned. As shown in FIGURE 3, the segment extensions 30–B are fastened to the reduced diameter sections 112 of the lower castings 110 by a plurality of socket head cap screws 113.

A lower shaft section 115 is positioned between the segment extensions 30–B. There are a plurality of collars 116 fixed to spaced recesses on the shaft 115, each collar 116 comprising two halves 117 and 118 fastened together by bolts 119. Each collar 117 has three pairs of lugs 120 extending outwardly from it, and each segment extension 30–B has a pair of lugs 121 opposite each pair of lugs 120. Toggle links 122 are positioned between the opposite pairs of lugs 120 and 121 and are pivotally held in place by pins 123 and 124, respectively.

There are additional collars 126 fixed to the shaft 115 opposite the lower castings 110. These lower castings 110 have recesses 127 in them similar to the recesses 100 in the head castings 31. A plurality of toggle links 128 are connected between the collars 126 and the lower castings 110 by pins which extend through lugs supported by the collars 126 and through the lower castings 110 in the same manner as the toggle connections between the collar 65 and the head castings 31.

If no intermediate extensions are used, the lower assembly 27 is fastened to the upper assembly 26 by a plurality of splice plates 132 fastened to the abutting enlongated segments 30 and segment extensions 30–B by hexagonal head cap screws 133, as illustrated in FIGURES 19 and 20. The shaft 115 is connected to the shaft section 56 by a shaft coupling 134 and a plurality of pins 135 which extend through the coupling 134 and the shafts 56 and 115. With these connections, the segment extensions 30–B and the lower castings 110 will move outwarly from and inwardly toward the composite shaft or jacking screw 55–56–115. The shaft coupling 134 causes the lower shaft 115 to move in a vertical direction as the upper shaft section 55 is threaded through the thrust plate 58. Therefore, the toggle links 122 and 128 positively effect expansion and contraction of the lower mandrel assembly 27. The heavy lower castings 110 provide sufficient strength at the bottom of the mandrel to prevent collapsing under the driving forces of a hammer.

FIGURES 1–C and 1–D illustrate different lengths of extension assemblies 28 and 29. The lengths of these extension assemblies are about 18 feet and 5 feet respectively, but these lengths may be varied or there may be additional extension assemblies used in addition to or instead of the assemblies 28 and 29. Any such extension assemblies are mounted between the upper mandrel assembly 25 and the lower mandrel assembly 27.

The extension assembly 28 comprises three segment extensions 30–C positioned about a shaft section 140. As will now be understood, there are a plurality of collars 141 spaced along the shaft 140 having lugs on them to which a plurality of toggle links 142 are pivotally attached. The other ends of the toggle links 142 are pivotally fastened to lugs 143 that are connected to the segment extensions 30–C. The splice plates 132 are used to connect the extension assembly 28 to whatever mandrel assemblies are above and below the extension assembly 28.

The short extension assembly 29 comprises the segment extensions 30–D which surround a short shaft 145. This shaft has collars 146 fastened to it with toggle links 147 pivotally connected to the collars 146 and to pairs of lugs 148 on the segment extensions 30–D.

*Operation*

To use the mandrel, a proper overall length is selected according to the length of pile casings which are to be driven into the ground. This means that one or more of the extension assemblies 28 and 29 may have to be fastened together end to end by the splice plates 30 and the shaft couplings 134. These connections are not difficult, and can be accomplished quickly, by driving the cap screws 133 into place through the splice plates 132 and the appropriate segment extensions and by driving the pins 135 into place through the shaft couplings 134 and the appropriate shaft extensions. In any event, the mandrel used has at least the upper mandrel assembly 26 and the lower mandrel 27 illustrated in FIGURES 1–A and 1–B and in various other figures of the drawings.

The mandrel is contracted by rotating the jacking screw 54 in a direction to thread it upwardly through the thrust plate 58. This is done by applying a pneumatic wrench to the cap screw 74, and as the shaft is raised, all of the mandrel segments 30, etc., are drawn inwardly toward the shaft or jacking screw 54. This causes the cap 40 to ride upwardly over the inclined surfaces 46 on the head castings 31, but the recesses 47 provide enough vertical space for that movement of the cap 40. Next, the mandrel is inserted into a pile casing, designated C in FIGURES 2 and 3 indicated in broken lines, until the upper edge of the casing C contacts the shoulders 37 on the head castings 31. The mandrel may have helical ribs R on its outer faces to engage the corrugations of the casing C.

Next, the operating nut 74 is rotated by the pneumatic wrench to thread the jacking screw 54 downwardly through the thrust plate 58. Since the thrust plate 58 cannot move vertically relative to the head castings 31, because it is restrained by the upper and lower shoulders of the recesses 59, the jacking screw 54 moves downwardly relative to the head castings 31 and the mandrel segments 30. This causes all of the toggle links 68, 97, 104, 122, 142 and 147 to pivot and force the various mandrel segments 30 and segment extensions 30–B, 30–C and 30–D outwardly against the pile casing C. As the jacking screw 54 is rotated, it presses these mandrel segments tightly against the casing C and compresses the metal tube 80 between the upper and lower washers 81 and 82 as the lower washer 82 is pressed against the upper surfaces of the thrust plate 58. In this way, the friction between the thrust plate 58, the lower Fabreeka washer 82, the tube 80 and the upper Fabreeka washer 81 produced by the downward pressure of the operating nut 74 locks the jacking screw against counter rotation while the mandrel is being driven.

The mandrel is normally driven by a hammer, the pressure of which is applied directly to the upper surface 42 of the cap 40. At this time, with the head castings 31 expanded, the head cap 40 is in approximately its lowermost position. As the hammer forces are applied to the head cap, these forces are transmitted directly to the shoulders 39 on the head castings. From there, the forces go directly from the lower sections 32 of the head castings to the elongated segments 30 to drive the casing C into the ground. Hence the driving forces do not depend upon transmission through the shaft or jacking screw 54 and the toggle links, and the only necessary function of the toggle links 68 is to expand and contract the mandrel. Another effect of the driving forces on the cap 40 is to produce an outward wedging action of the cap against the head castings by virtue of the inclined surfaces 44 and 46. Hence, the blows of the hammer tend to expand the mandrel or at least keep it in its expanded condition during the driving of a pile casing C.

After the casing has been driven, the mandrel is again contracted by threading the jacking screw 54 upwardly through the thrust plate 58. After it is contracted, the mandrel can be removed by engagement of the lugs 50 by a lifting crane.

Various changes and modifications may be made within the process of this invention as will be readily apparent to those skilled in the art. Such changes and modifications are within the scope and teaching of this invention as defined by the claims appended hereto.

What is claimed is:

1. An expandable mandrel for driving a hollow pile casing comprising a plurality of segments spaced about a common longitudinal axis, a threaded shaft positioned substantially along the axis, an enlarged head member attached to each segment, a plurality of links connected between the shaft and the segments, a thrust plate supported by the head members, the shaft being threaded through the thrust plate to move the shaft vertically when turned through the thrust plate, the links causing alternate expansion and contraction of the mandrel when the shaft is rotated, the side of the shaft being splined adjacent its upper end, and an operating nut of hard steel with a splined inner opening, the operating nut being attached to the upper end of the shaft by interfitting of the shaft and nut splines to provide a semi-permanent attachment while permitting replacement of the nut, a cap mounted upon the head sections for receiving driving hammer blows on its upper surface, the nut being positioned below the upper surface of the cap but being accessible through a hole in the cap.

2. The combination of claim 1 including a tube loosely mounted on the shaft between the nut and the thrust plate, the length of the tube being such as to permit rotation of the shaft sufficiently to expand the segments and to be tightly pressed between the nut and the thrust plate to frictionally lock the shaft against rotation to contract the segments from their expanded positions.

3. A mandrel for driving hollow pile casings comprising a plurality of elongated segments spaced around a central axis, the segments being arcuate about the axis, a shaft positioned along the axis, a plurality of toggle links pivotally connected to the shaft and to the segments, means to cause expansion of the segments through the toggle links when the shaft is lowered relative to the segments, a plurality of segment extensions positioned below and abutting the lower ends of the first mentioned segments, a plurality of splice plates bolted to the abutting segments and segment extensions to fasten them together, a shaft extension abutting the lower end of the aforementioned shaft, a connecting collar fastened to the abutting ends of the shaft and shaft extension to connect them together, and a plurality of toggle links pivotally connected to the segment extensions and to the shaft extension.

4. The mandrel of claim 3 wherein part of the shaft is rotatable and part is stationary and there is a connecting collar between the rotatable and stationary parts, and a thrust plate supported by the segments, the rotatable shaft part being threaded through the thrust plate.

5. The mandrel of claim 4 wherein the segments have enlarged upper ends with recesses on their inner sides and the thrust plate is received within the recesses.

6. The mandrel of claim 5 including locking key means between the thrust plate and the segments to prevent rotation of the thrust plate when the rotatable shaft is rotated.

References Cited by the Examiner

UNITED STATES PATENTS

| 2,437,043 | 3/48 | Reimenschneider et al. | 61—53.72 |
| 2,684,577 | 7/54 | Smith | 61—53.72 |
| 2,881,593 | 4/59 | Cobi | 61—53.72 |

FOREIGN PATENTS

| 235,037 | 5/11 | Germany. |
| 251,202 | 9/12 | Germany. |

EARL J. WITMER, *Primary Examiner.*

JACOB SHAPIRO, *Examiner.*